United States Patent [19]

Henningsen et al.

[11] Patent Number: 4,693,545
[45] Date of Patent: Sep. 15, 1987

[54] APPARATUS FOR THE CONTROLLED TRANSMISSION OF LIGHT

[75] Inventors: Tom Henningsen, Monroeville Boro; Theresa A. Gould, Wilkinsburg, both of Pa.

[73] Assignee: Westinghouse Electric Corp., Pittsburgh, Pa.

[21] Appl. No.: 646,723

[22] Filed: Sep. 4, 1984

[51] Int. Cl.$^4$ .................................................. G02B 6/12
[52] U.S. Cl. ................................. 350/96.12; 330/4.3; 372/6; 372/8
[58] Field of Search ................. 350/96.1, 96.29, 96.30, 350/96.34, 354, 393; 330/4.3; 372/6, 8, 11

[56] References Cited

U.S. PATENT DOCUMENTS

| 3,440,562 | 4/1969 | Koester | 372/8 |
| 3,909,749 | 9/1975 | Weber | 350/96.12 |
| 3,931,591 | 1/1976 | Greenberg | 372/11 X |
| 4,160,956 | 7/1979 | Fader | 330/4.3 X |
| 4,209,690 | 6/1980 | Rentzepis | 455/611 |
| 4,364,014 | 12/1982 | Gray | 330/4.3 |
| 4,382,660 | 5/1983 | Pratt, Jr. et al. | 350/353 |
| 4,633,475 | 12/1986 | Harter et al. | 372/11 X |

Primary Examiner—William L. Sikes
Assistant Examiner—Frank González
Attorney, Agent, or Firm—Thomas R. Trempus

[57] ABSTRACT

The invention provides a method for controlling the transmission of radiant energy through a light transmissive medium and an apparatus whereby the method can be effected. The method includes the steps of introducing a first flux of photons, or the evanescent field thereof, into said medium said photons having energy E, and said medium having energy level characteristics such that the energy, E, of said first flux of photons matches an energy gap between an energy level designated as energy level 2, and another energy level designated as energy level 3 of said medium, and said first flux is substantially unattenuated as said first flux of photons, or the evanescent field thereof, passes through said medium; and selectively introducing a second flux of photons, or the evanescent field thereof, into said medium to attenuate said first flux of photons, said second flux of photons causing the population of energy level two of said medium, wherein a portion of said first flux is absorbed, inducing a population in level 3, a portion of which population in level 3 returns to level 2 and is available for further attenuation of said first flux, whereby the control of the transmission of said first flux of photons by said second flux of photons is more efficient than if the return of excited states from level 3 to level 2 did not occur.

45 Claims, 15 Drawing Figures

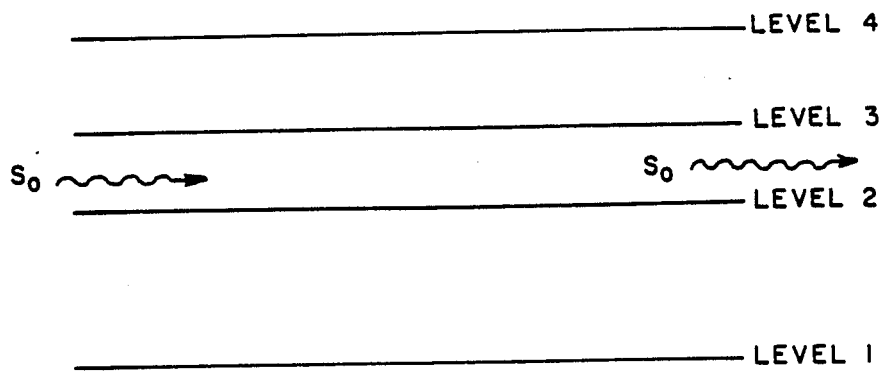
FIG. IA
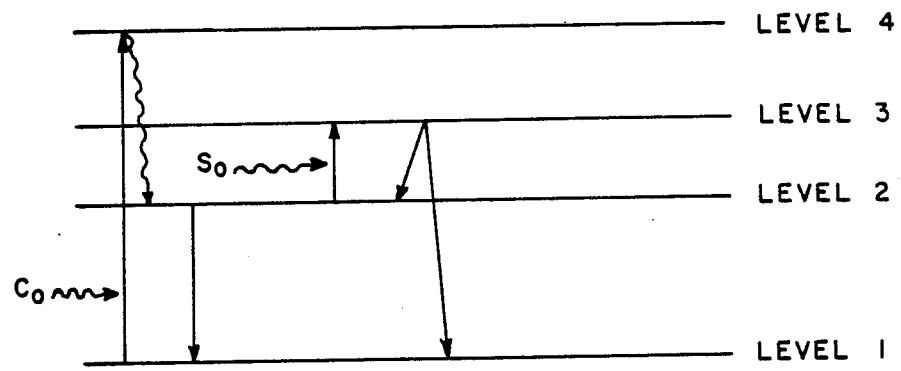
FIG. IB

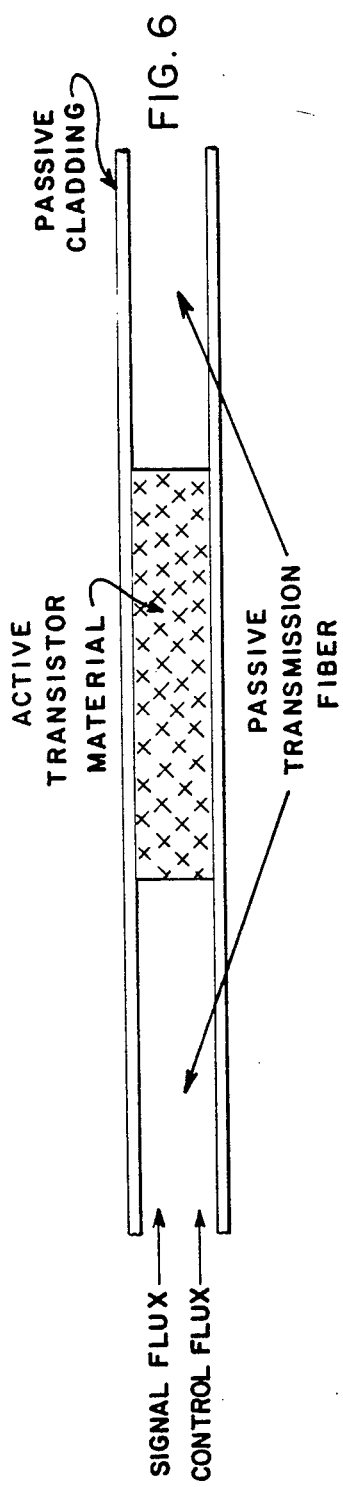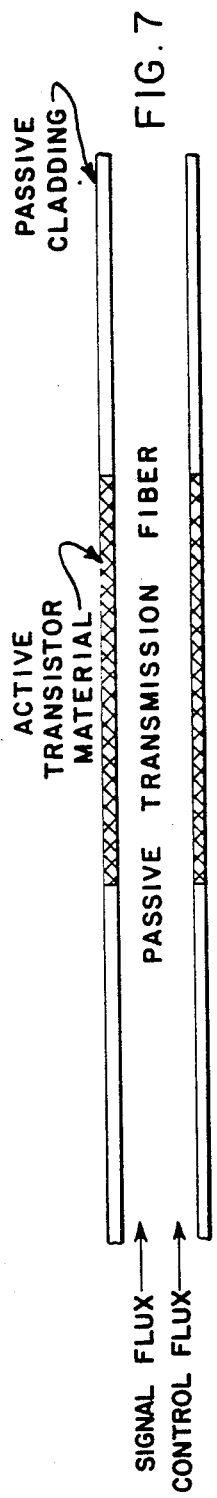

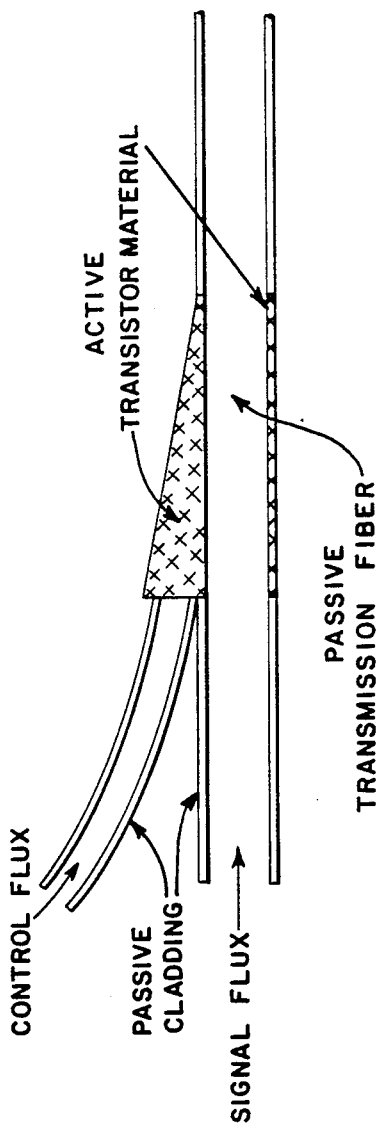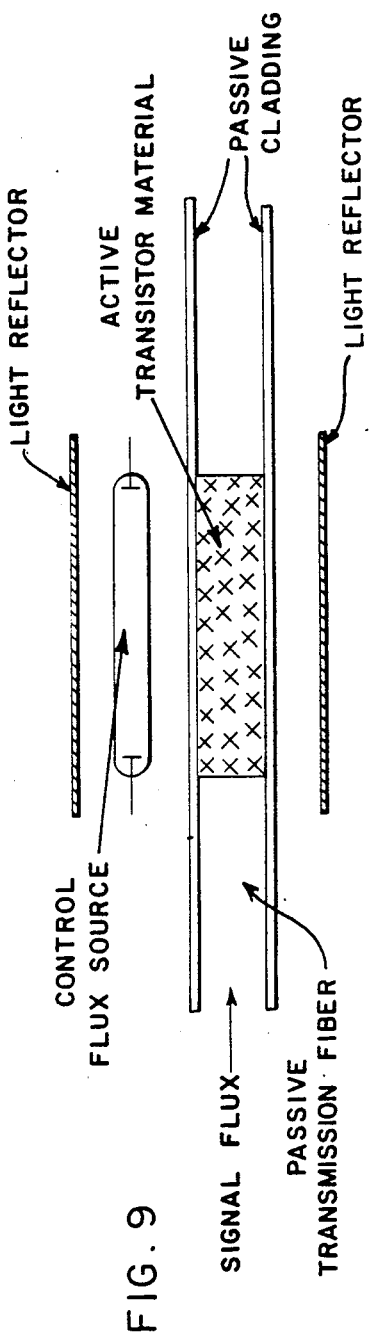

APPARATUS FOR THE CONTROLLED TRANSMISSION OF LIGHT

BACKGROUND OF INVENTION

1. Field of the Invention:

The invention relates to a technique for the controlled transmission of radiant energy. More particularly, the invention is directed to an apparatus and systems in which the transmission of a flux of light or other radiant energy as it passes through an appropriate medium is controlled by a second flux of radiant energy, or the evanescent field thereof, such that transistor-like gain is achieved. Contemplated applications of the apparatus of this invention include fiber optics, optical integrated circuits, macroscopic optical devices for communications, sensing and control, optical computing, image processing, etc.

2. Description of the Prior Art:

A significant part of modern technology is concerned with apparatus and systems in which radiant energy is in some way altered during transmission through a medium. Communications systems, for example, may make use of a carrier wavelength of radiation energy which is somehow altered in analog or digital manner so as to represent intelligence. An ever-increasing part of technology depends upon communications systems of increasing sophistication which again generally depend upon a variation of some characteristic of energy with complex computations being the cumulative result of a multiplicity of such variations, possibly in discrete control elements. Such systems have, in the past, depended on relatively low frequency energy, perhaps DC, while later developments make increasing use of higher and higher frequency energy. This trend has gained impetus through the invention and development of the laser oscillator, variations of which may now produce CW or pulsed radiation at wavelengths from the far infrared through the visible spectrum and into the ultraviolet.

It is known to use induced absorption within a medium for one or more specified wavelengths of energy. Induced absorption permits operations such as those of switching and modulating, for example, for the interposition of variations representing information. U.S. Pat. No. 4,209,690 assigned to Bell Telephone Laboratories discloses an apparatus which can operate as an extremely rapid shutter, a switch, a modulator or a pulsed sharpener.

However, in the design of fiber or integrated optical circuits there remains a need for an optical amplifying system which can perform in a manner analogous to the transistor in an electronic circuit. While optical amplification based on photon multiplication via stimulated emission or parametric amplification is known, it is an object of this invention to disclose an optical amplifier which utilizes excited state absorption to produce a variable optical resistance or absorption. The result is a device characterized by transistor-like gain in switching capabilities.

It is another object of this invention to provide an optical transistor in which the photons from a control flux of radiant energy modulate the intensity of a signal flux of radiant energy in such a way that a change of one photon in the control flux causes a change of more than one photon in the signal flux.

It is yet another object of this invention to provide an optical transistor which utilizes a first and a second control flux of radiant energy such that a one photon increase in the first control flux causes a decrease of more than one photon in the signal flux, while a one photon increase in the second control flux causes an increase of more than one photon in the signal flux.

SUMMARY OF THE INVENTION

The invention provides a method for controlling the transmission of radiant energy through a light transmissive medium and an apparatus whereby the method can be effected. The method includes the steps of introducing a first flux of photons, or the evanescent field thereof, into said medium, said photons having energy E, and said medium having energy level characteristics such that the energy, E, of said first flux of photons matches an energy gap between an energy level designated as energy level 2, and another energy level designated as energy level 3 of said medium, and said first flux is substantially unattenuated as said first flux of photons, or the evanescent field thereof, passes through said medium; and selectively introducing a second flux of photons, or the evanescent field thereof, into said medium to attenuate said first flux of photons, said second flux of photons causing the population of energy level two of said medium, wherein a portion of said first flux is absorbed, incducing a population in level 3, a portion of which population in level 3 returns to level 2 and is available for further attenuation of said first flux, whereby the control of the transmission of said first flux of photons by said second flux of photons is more efficient than if the return of excited states from level 3 to level 2 did not occur.

BRIEF DESCRIPTION OF THE DRAWINGS

The above as well as other features and advantages of the present invention can be appreciated through consideration of the detailed description of the invention in conjunction with the several drawings in which:

FIGS. 1A and 1B are generalized energy level diagrams illustrating the mechanism by which the optical transistor according to this invention operates;

FIG. 6 is an embodiment of an optical transistor utilizing a fiber optic strand wherein the active transistor material is contained in a section of the fiber core;

FIG. 7 is an alternative embodiment of the optical transistor in which the active transistor material is contained in a section of the fiber optic cladding;

FIG. 8 is an alternative embodiment of the optical transistor in which the control flux is guided into an active cladding section by a separate fiber;

FIG. 9 is an alternative embodiment of the optical transistor in which the control flux source is independent of the active transistor material contained in the optical fiber;

DETAILED DESCRIPTION OF THE INVENTION

General Description

Basic Optical Transistor Mechanism

Figure 2A:
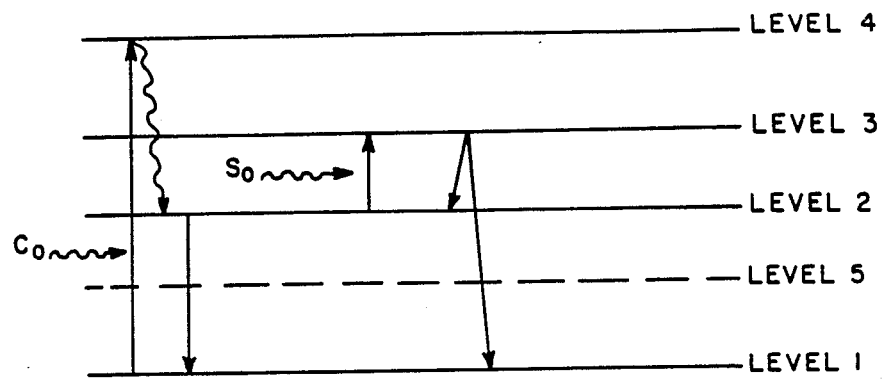
FIGS. 2A and 2B are generalized energy level diagrams illustrating the mechanism by which a first and a second control flux of radiant energy are used in an optical transistor according to this invention.

The invention, hereafter called the optical transistor, contains a suitable material, which may be crystalline, glass, liquid, vapor, organic or inorganic, such that the transmission of a flux of photons (hereafter called the signal flux) through the device is controlled by a second flux of photons (hereafter called the control flux or the evanescent field thereof). Furthermore, the interaction of these photon fluxes or their evanescent fields, with the material produces a "gain" effect such that a small number of control flux photons, $n_1$, controls the transmission of a larger number of signal photons, $n_2$. This control of many signal photons by few control photons is analogous to the modulation of large collector current by small base current in electrical transistor—hence the term optical transistor.

The mechanism by which the optical transistor operates requires a material in which induced absorption occurs among energy levels which have appropriate life-times, branching ratios and absorption cross sections. The generalized energy level diagram, FIG. 1, illustrates the process. For simplicity, only direct interactions of the photon fluxes with the material are shown, but interaction via the evanescent fields is also possible. Level 1 is the ground state and levels 2, 3 and 4 are not substantially populated at room temperature. The signal flux, $S_0$, is matched to the energy difference between levels 2 and 3, therefore it normally passes through the material substantially unattenuated. The control flux, $C_0$, populates level 4 which relaxes rapidly to a metastable state, level 2. Some decay from level 2 to level 1 occurs; however, the signal flux can now be absorbed and transfer excited states from level 2 to level 3. Some excited states in level 3 decay to level 2 and—if the transition rates into and out of level 2 are correct—are available to absorb more signal photons without the expenditure of additional control photons. If the induced transistion rate from level 2 to level 3 is much greater than the decay rate out of level 2, the introduction of $n_1$ control photons causes the absorption of $n_2$ signal photons with $n_2 > n_1$, and a gain effect is achieved.

Any of the discrete levels shown in FIG. 1 could be a multiplicity of levels or a continuum band. The downward transistions may be radiative or non-radiative in nature. Level 3 may lie at a higher energy than level 4, or they may be the same level, or level 4 may be removed with the control flux populating level 2 from level 1 directly. Also, more energy levels may exist in the system which are not directly involved in the transistor mechanism, or through which excited states may rapidly cascade in downward transistions. The gain of an optical transistor is defined as $$G = \left| \frac{dS_f}{dC_o} \right|,$$

the change in the final signal flux, $dS_f$, for a given change in control flux, $dC_o$. The absolute value is used since an increase in $C_o$ produces a decrease in $S_f$. A simple steady-state rate-equation analysis of the energy level scheme described above yields $$G = \frac{k}{a_{31} + (\tau_2^{-1}/\gamma\sigma_{23}S_f)}$$

where $S_f$ is the final signal flux (photons/cm²-sec), k is the fraction of the control flux which is absorbed in the transistor process, $a_{31}$ is a materials parameter given by spontaneous decay rates in the system, $\tau_2^{-1}$ is the spontaneous decay rate of level 2, $\sigma_{23}$ is the cross section for absorption from level 2→3, and $\gamma = 1$ for direct interaction of the flux with the material, and $\gamma < 1$ for interaction of the evanescent field, making $(\gamma\sigma_{23})$ an effective cross section for absorption in the case of evanescent field interaction. The change in signal flux as it traverses the optical transistor, $S_o - S_f$, is given by $$a_{31}(S_o - S_f) - 1/\tau_2\gamma\sigma_{23} \ln (S_f/S_o) = k\, C_o$$

Controlled Population Mode

Figure 2B:
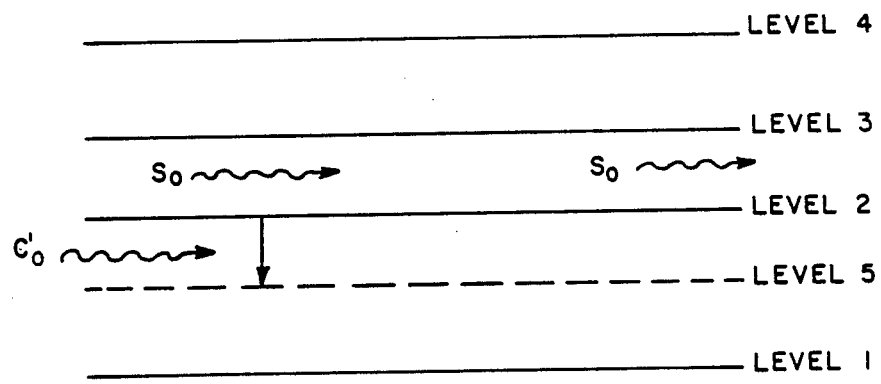

The response time of the device described in Section 2.1 is limited by $\tau_2$, the lifetime of the metastable level 1—assumed to be the longest relevant lifetime in the system. This limitation can be overcome if a fifth level is available as shown in FIG. 2. Here, a second control flux, $C_o'$ is matched to the energy gap between levels 2 and 5, and rapidly empties level 2 by stimulated emission.

"Complementary" Optical Transistors

Figure 3:
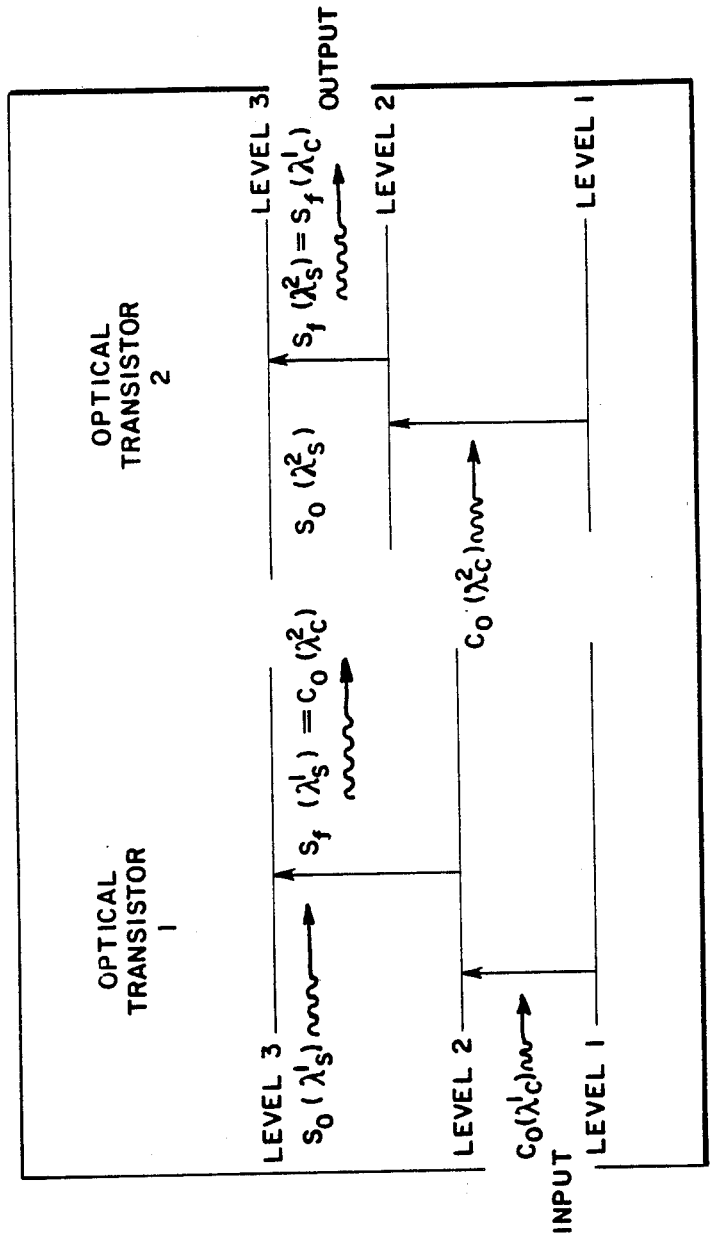
FIG. 3 is a simplified energy level diagram illustrating a complementary energy level scheme for a pair of associated optical transistors.

The optical transistor concept described herein departs slightly from an electrical transistor analog in that the amplified output (final signal flux) is at a different wavelength than the controlling input (control flux). In the optical transistor one must deal with photons of two different wavelengths, whereas all the electrons in the collector and base currents of an electrical transistor are of the same kind. The problem can be overcome by using pairs of optical transistors made from materials with "complementary" energy level schemes as illustrated in FIG. 3. (In this Figure, level 4 is omitted for simplicity and the population of level 2 occurs directly from the ground state.) Here, the output signal flux from the first, $S_f$ is at wavelength $\lambda^1_s$. This output, $S_f(\lambda^1_s)$, becomes the control flux for the second transistor at wavelength $\lambda_c^2$, since $\lambda_s^1 = \lambda_c^2$. The complementary energy level scheme requires a signal in transistor 2 at the same wavelength as the control flux in transistor 1 so that, $\lambda^2_s = \lambda^1_c$ also. Thus, the input and output of the two-transistor device are the same wavelength, $\lambda^1_c$. The significance of this concept is that a set of optical transistors paired in this manner can be used as a unit building block in more complicated analog and digital optical circuits with the photon output from one unit used directly as input for one or more other units. This optical unit is then a direct analog to the transistor used in electrical circuits.

Materials Requirements

The gain of the optical transistor is given by $$G = \frac{k}{a_{31} + (\tau_2^{-1}/\gamma\sigma_{23}S_f)}$$

From this expression we see that the maximum theoretical gain is obtained as $k \to 1$ (control flux fully absorbed) and $\tau_2 \to \infty$, infinite lifetime in level 2. Thus, the maximum theoretical gain is $$G_{max} = 1/a_{31} = \tau_3^{-1}/\tau_{31}^{-1}.$$

the ratio of the overall spontaneous decay rate from level 3, $\tau_3^{-1}$, to the direct decay rate from level 3→1, $\tau_{31}^{-1}$. (This development applies strictly to the energy level system described above, but the results are applicable in general with the obvious modifications for other energy levels and transition schemes included.) To optimize the maximum theoretical gain, $\tau_{31}^{-1} \to 0$, or conversely, the return of excited states to level 2 rather than level 1 must be optimized. This is the primary materials requirement to maximize gain in an optical transistor.

The second term on the denominator, $\tau_2^{-1}/\gamma\sigma_{23}S_f$, will limit the intrinsic gain to values below the maximum theoretical gain. (In principle, one can arrange $k \to 1$ so that there is no fundamental material limitation introduced by the numerator of the expression for gain.) This term represents the ratio of spontaneous downward transitions out of level 2, $\tau_2^{-1}$, to induced upward transitions 2→3, $(\gamma\sigma_{23}S_f)$. As the upward transition rate becomes large compared with the decay rate, $(\gamma\sigma_{23}S_f) >> \tau_2^{-1}$, the theoretical gain is approached.

Therefore, we require $$a_{31} \leq 0.09$$

and $$\gamma\sigma_{23}S_f >> \tau_2^{-1}$$

for an optical transistor with an intrinsic gain $$G \geq 10.$$

The foregoing describes the requirements for steady-state operation, i.e., modulation times much longer than any lifetime in the system. For a rapidly pulsed system, the pulse rate $\tau_p^{-1}$ is the limiting factor rather than the decay rate from level 2, therefore the relevant equation becomes $\gamma\sigma_{23}S_f >> \tau_p^{-1}$. Also, the decay from level 3→2 must occur on a timescale much shorter than the pulse, $\tau_{32}^{-1} >> \tau_p^{-1}$.

$UO_2^{2+}$ Embodiment

Figure 4:
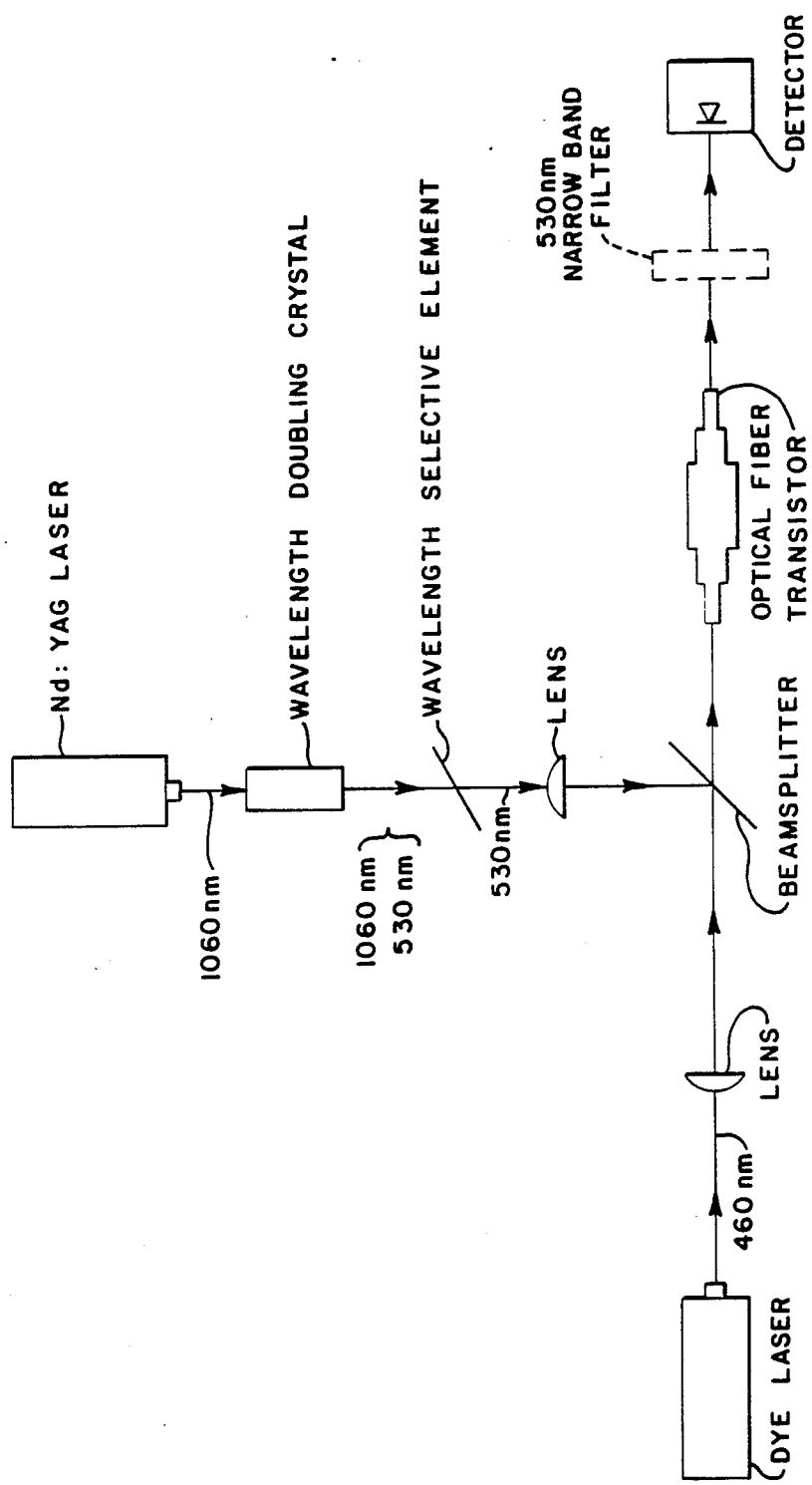
FIG. 4 is a schematic representation of an apparatus utilized in the demonstration of an optical transistor.

In this section we describe a specific embodiment of the optical transistor—a $UO^{2+}_2$ doped barium crown glass fiber—and set forth the device response for given system parameters. Demonstration of the optical transistor can be achieved with the system shown in FIG. 4.

Figure 5:
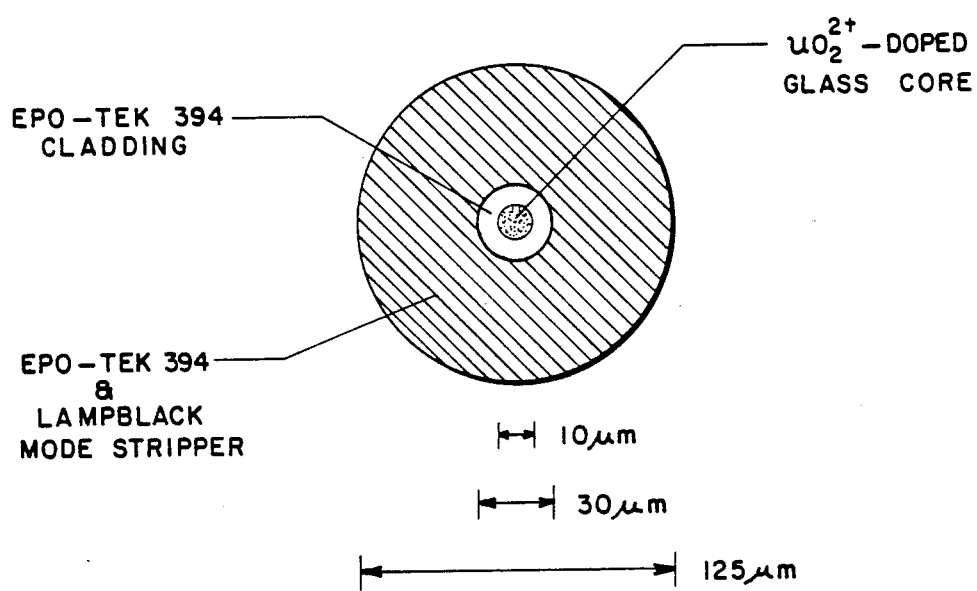
FIG. 5 is a cross-sectional view of an optical transistor incorporated into a fiber optic strand.

The optical transistor itself is a 5 cm long fiber with a 10 μm diameter core of $UO^{2+}_2$ doped barium crown glass. The glass composition is given in Table 1. This glass core is clad with Epo-tek 394 out of a total diameter of 30 μm. An outer cladding of Epo-tek 394 and finely divided carbon powder (lampblack) makes the total diameter 125 μm (FIG. 5). The outer absorbing cladding acts as a mode stripper by removing any modes propagating in the cladding instead of in the core. The fiber is mounted in an Amphenol 905 series fiber optic connector matched to the diameter of the fiber.

TABLE 1

| Constituent | Wt. % |
|---|---|
| $SiO_2$ | 57.6% |
| BaO | 25.0% |
| $K_2O$ | 15.0% |
| $Sb_2O_3$ | 1.0% |
| $UO_2$ | 1.4% |

A signal flux at 530 mm is supplied by a doubled Nd:YAG laser and a control flux at 460 nm is supplied by a dye laser. These fluxes are focused independently by lenses on micrometer mountings before they encounter the beam splitter. This facilitates very accurate focusing of the portion of each beam which strikes the fiber, insuring that these incident beams are co-linear and overlap completely as they enter the fiber core. The output fluxes are detected by a conventional Si diode detector. When both fluxes are present during operation, the transmitted signal flux, $S_f$, can be detected separately from any transmitted control flux, $C_f$, by the use of a narrow band filter.

The steady-state gain of the $UO^{2+}_2$ optical transistor can be demonstrated with the system described above. Since gain is defined $$G = |dS_f/dC_o|$$

the most straightforward way to measure it, in principle, is to measure the final signal with no control flux, $S_f$, and then with the control flux present, $S'$ so that $$G = |dS_f/dC_o| = \left|\frac{S_f - S_f'}{C_o - C_o'}\right| = \frac{S_f - S_f'}{C_o}.$$

$S_f$ and $S_f'$ are easily measured, however, the value of $C_o$, the control flux which is launched into the fiber core and participates in the transistor process, is difficult to obtain. A small percent of any beam incident on the fiber will be reflected at the fiber surface, and some small portion may also be launched into the cladding instead of into the core. (The absorbing outer cladding prevents these modes from propagating to the detector.) Another small portion of the flux that is successfully launched into the fiber core may also be scattered or absorbed by defects in the fiber. These loss mechanisms cannot be measured directly, therefore an accurate value of $C_o$ is difficult to obtain. However, the final control flux, $C_f$, is easily measured and can be related to the intrinsic gain by $$\frac{S_f - S_f'}{C_f} = G\left(\frac{k}{1-k}\right)$$

where k is the fraction of the control beam that is absorbed. For the appropriate $UO^{2+}_2$ absorption cross section and the specified doping concentration and length of fiber, 99% of the control flux will be absorbed. Thus, for the specific $UO_2^{+2}$ optical transistor described in this section, $$G = 1.01 \times 10^{-2} \left( \frac{S_f - S'_f}{C_f} \right)$$

$S_f$ and $C_f$ are not independent, but are related by the equations which describe the transistor action in the section entitled Basic Optical Transistor Mechanism. For example, an effective control flux, $C_o = 6.81$ μW is required to produce a 2% modulation of a 0.751 mW signal. Under these conditions, one would measure $S_f = 0.751$ mW, $S'_f = 0.736$ mW, $C_f = 0.068$ μW, yielding a gain of 2.2. Therefore, for realistic laser powers and photon densities in the fiber, an intrinsic gain $> 2$ can be obtained with a $UO_2^{2+}$ optical transistor.

The scheme described above is a demonstration of the optical transistor effect in $UO_2^{+2}$ which has a rather low intrinsic gain, and operates at short wavelengths. Other materials with suitable properties will yield gain in the presence of extraneous losses in fiber optic or integrated optic systems and will operate at wavelengths supplied by convenient laser diode sources.

Other Embodiments

Several fiber optic embodiments of the optical transistor are given in FIGS. 6-9. In FIG. 6 the active transistor material is contained in a fiber core and the signal and control fluxes are propagated into the active region along the same fiber. FIG. 7 shows the active material comprising a section of fiber cladding. The energy of the two fluxes is propagated in the core but their evanescent fields extend into the cladding and activation of the cladding by the control flux will affect the transmission of the signal flux. FIG. 8 shows the control flux guided into the active cladding by a separate fiber. The control flux need not be a guided flux as FIG. 9 illustrates. Here the control flux is supplied by a lamp which activates a section of fiber core; alternatively, the same arrangement could activate a fiber cladding. FIGS. 6-9 illustrate fiber optic embodiments in which the active transistor material is comprised of solid materials. However, a capillary tube of liquid or gas could be substituted for the active fiber regions of FIGS. 6 and 9. The fluxes are not totally internally reflected in a capillary as they are in a clad fiber but capillary tubes guide light effectively for grazing incidence.

Figure 10:
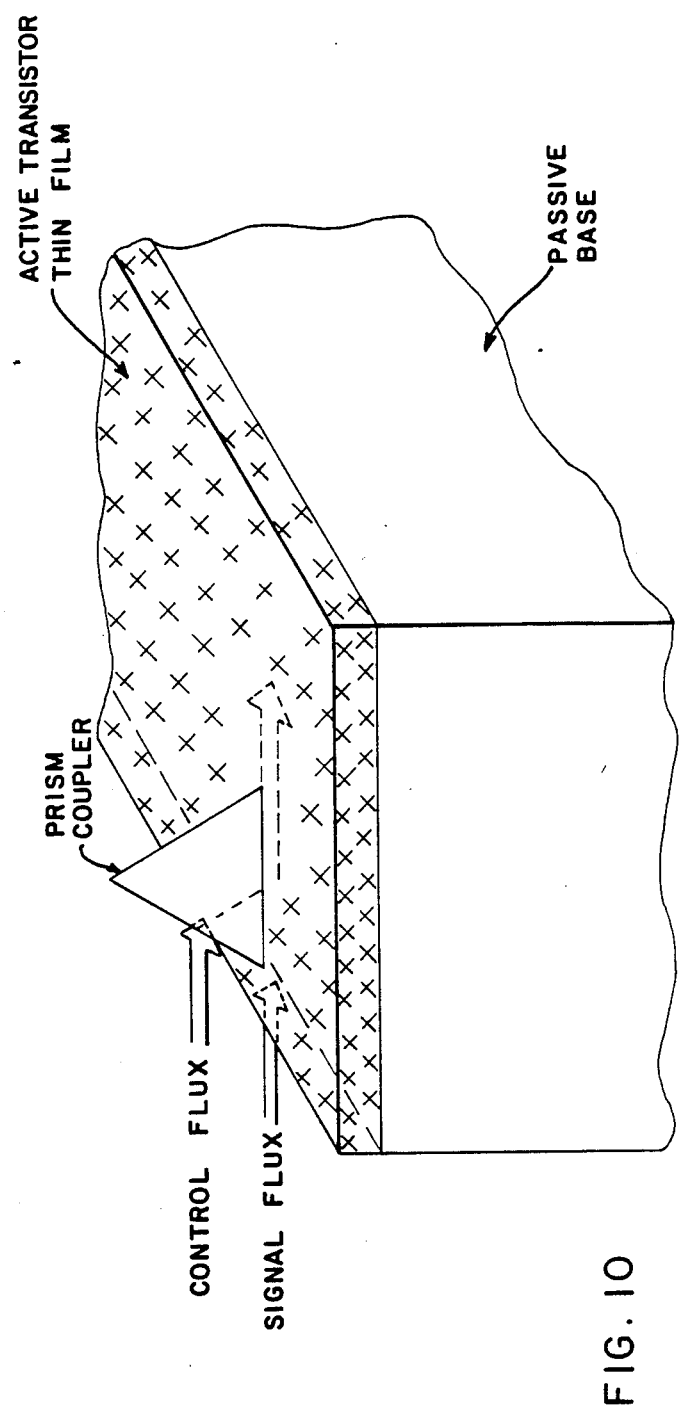
FIG. 10 is an alternative embodiment of the active optical transistor in which the optical transistor material is incorporated into a thin film waveguide.

Optical transistor materials can also be incorporated into thin film waveguides. FIG. 10 illustrates a case in which the active material comprises the thin film. The example shows the signal flux edge coupled and the control flux prism coupled to the film, however, the fluxes may be interchanged in the drawing or both may be coupled in the same manner either separately or together such that the fluxes are coincident at the point of entry into the film. Also, the active transistor material may be restricted to a strip of thin film through which the fluxes propagate, or it may be in the base material and interact through the evanescent fields of the guided fluxes.

Figure 11:
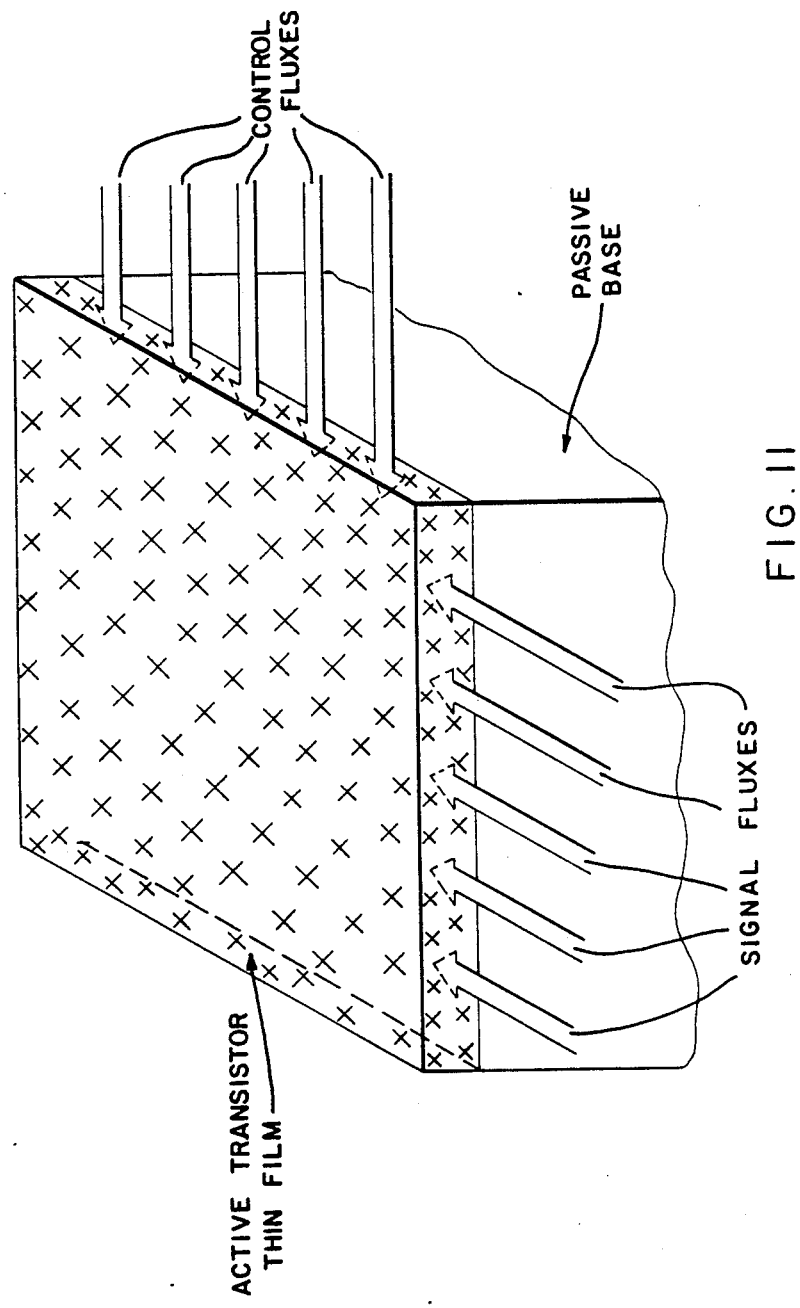
FIG. 11 is an alternative embodiment of a thin film optical transistor in which several signal fluxes are controlled by several control fluxes which can be selectively activated along the path of the signal fluxes.

The planar area afforded by thin film embodiments may also be utilized by allowing several signal and control fluxes to interact on perpendicular paths as shown in FIG. 11 (only edge coupling is illustrated for simplicity). Now the signal fluxes are controlled not only by the magnitude and changes of a single control flux, but also by a number of control fluxes which can be selectively activated along the path of the signal fluxes. FIG. 11 illustrates the active transistor material comprising the thin film waveguide; again the waveguide itself may be passive and the active material may be in the base.

Figure 12:
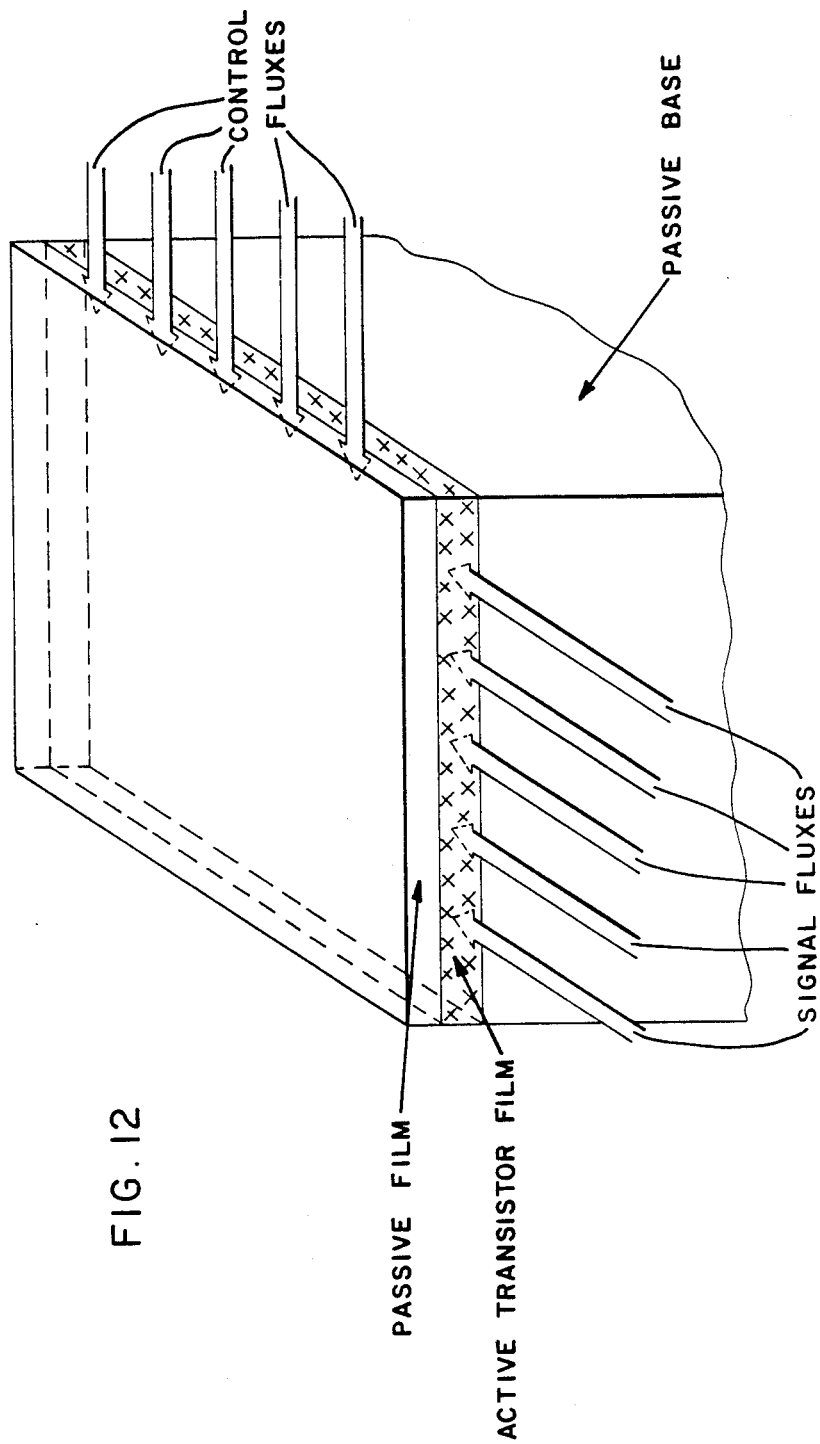
FIG. 12 is an alternative embodiment of a thin film optical transistor according to this invention in which the signal and control fluxes are propagated in two different films.

Also, the signal and control fluxes may be propagated in two different films, one the active transistor material and one passive. FIG. 12 illustrates this case for perpendicular groups of signal and control fluxes, however, it applies just as readily to co-linear cases such as FIG. 10. In FIG. 12 the signal fluxes propagate in the active film and the control fluxes in the passive film, however, this could be reversed. The relative position of the two films could also be reversed providing the upper film has the lower index of refraction.

Figure 13:
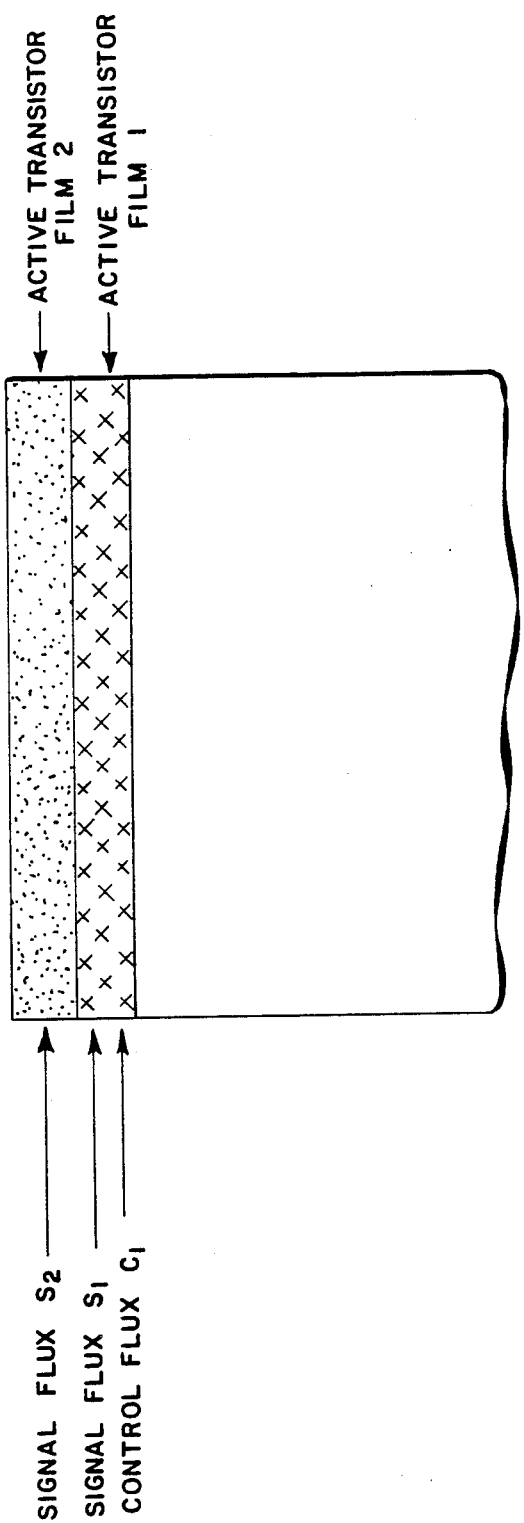
FIG. 13 illustrates an alternative embodiment in which two active transistor thin films are used.

The propagation of fluxes in more than one film provides a method for stacking optical transistors in the vertical dimension. FIG. 13 illustrates a film embodiment in which two active transistor films are used. In the lower film, control and signal fluxes $C_1$ and $S_1$ propagate. The transmission of $S_2$ in the upper film is controlled by the evanescent field of $S_1$. Therefore, $S_1$ becomes the control flux for $S_2$. This arrangement presents the possibility of device input, $C_1$, and output, $S_2$, being at the same wavelength which may be desirable for some applications.

We claim:

1. Apparatus for controlling the transmission of radiant energy comprising:

a light transmissive medium in communication with a means for introducing a first flux of photons, or the evanescent field thereof, into said medium, said photons having energy E, and said medium having energy level characteristics such that the energy, E, of said first flux of photons matches an energy gap between an energy level designated as energy level 2 and another energy level designated as energy level 3 of said medium, and said first flux is substantially unattenuated as said first flux of photons, or the evanescent field thereof, passes through said medium; and means in communication with said medium for selectively introducing a second flux of photons, or the evanescent field thereof, into said medium to attenuate said first flux of photons, said second flux of photons causing the population of energy level 2 of said medium, wherein a portion of said first flux is absorbed, inducing a population in level 3, a portion of which population in level 3 returns to level 2 and is available for further attenuation of said first flux, whereby the control of the transmission of said first flux of photons by said second flux of photons is more efficient than if the return of excited states from level 3 to level 2 did not occur;

and furthermore, the introduction of $n_1$ photons of said second flux, or the evanescent field thereof, causes the absorption of $n_2$ photons of said first flux, wherein $n_2$ is greater than $n_1$, when $\tau_p^{-1} >> \tau_2^{-1}$, $k \geq 0.90$, $\tau_{31}^{-1}/\tau_3^{-1} \geq 0.80$, and $\tau_2^{-1}/(\gamma \sigma_{23} S_f) \leq 0.01$, where $\tau_p^{-1}$ is the pulse rate of said second flux, $\tau_2^{-1}$ is the spontaneous decay rate from level 2, k is the fraction of said second flux which is absorbed in populating level two of said medium, $\tau_{31}^{-1}$ is the decay rate for direct transitions from level 3 to level 1, $\tau_3^{31\ 1}$ is the overall spontaneous decay rate from level 3, $\gamma \sigma_{23}$ is the effective cross section for absorption of said first flux in inducing transitions from level 2 to level 3, where $\gamma = 1$ if said first flux is introduced directly into said medium, and $\gamma < 1$ if the evanescent field of said first flux is introduced into said medium, and $S_f$ is the final number of photons per square centimeter per second in said first flux after said first flux, or the evanescent field thereof, has passed through said medium;

and wherein the introduction of said second flux, or the evanescent field thereof, causes the absorption of $n_2$ photons of said first flux, wherein $n_2$ is greater than $n_1$, when $\tau_p^{-1} >> \tau_2^{-1}$, $k \geq 0.90$, $\tau_{31}^{-1}/\tau_3^{-1} \geq 0.80$, and $\tau_p^{-1}/(\gamma\sigma_{23}S_f) \leq 0.01$.

2. The apparatus of claim 1, including, means in communication with said medium for selectively introducing a third flux of photons, or the evanescent field thereof, into said medium to reduce the attenuation of said first flux of photons, said third flux of photons depopulating level two, thereby interrupting the efficient transfer of excited states between levels two and three which causes the attenuation of said first flux of photons, whereby the reduction of attenuation of said first flux of photons by said third flux of photons is more efficient than if the return of excited states from level two to level three did not occur;

and wherein, the introduction of $n_3$ photons of said third flux or the evanescent field thereof causes a change in the transmission of $n_4$ photons of said first flux, wherein $n_4$ is greater than $n_3$ when, $\tau_p^{-1} >> \tau_2^{-1}$, $k \geq 0.90$, $\tau_{31}^{-1}/\tau_3^{-1} \geq 0.80$, and $\tau_2^{-1}/(\gamma\sigma_{23}S_f) \leq 0.01$, and when $\tau_p^{-1} << \tau_2^{-1}$, $k \geq 0.90$, $\tau_{31}^{-1}/\tau_3^{-1} \geq 0.80$, and $\tau_p^{-1}/(\gamma\sigma_{23}S_f) \leq 0.01$.

3. The apparatus of claim 1, wherein a second light transmissive medium is introduced, said second medium in communication with a means for introducing a flux of photons, designated as flux 1', or the evanescent field thereof, and in communication with a means for introducing the transmitted output of said second flux, or the evanescent field thereof, after said second flux, or the evanescent field thereof, has passed through said first medium;

said second medium, and said flux 1', having characteristics such that the overall transmitted output of said two media used in conjunction, occurs at the same wavelength as the initial controlling input of said second flux of photons;

in that said second medium has an energy level structure such that there exists an energy gap between levels designated as 1' and 2' which equals the energy gap between levels 2 and 3 of said first medium, which is matched to the energy, E, of said first flux of photons, and, said flux of photons, 1', has energy E', which is matched to the energy gap between levels designated as levels 2' and 3' of said second medium, such that said flux of photons 1' is substantially unattenuated as said flux 1', or the evanescent field thereof passes through said second medium, such that, when the transmitted output of said first flux, or the evanescent field thereof, is selectively introduced into said second medium, said first flux, or the evanescent field thereof, having passed through said first medium, said first flux subsequently causes the attenuation of said flux 1' by inducing a population in energy level 2' of said second medium, wherein a portion of said flux 1', is absorbed, inducing a population in level 3', a portion of which population in level 3' returns to level 2', and is available for further attenuation of said flux, 1', whereby the transmission of said flux of photons, 1', is controlled by the transmitted output of said first flux of photons in the manner detailed in claim 1 for said first medium and said first and second fluxes;

and wherein said transmitted first flux of photons, which controls the transmission of said flux 1', as said flux 1', or the evanescent field thereof, passes through said second medium, is in turn controlled by the introduction of said second flux of photons, or the evanescent field thereof, into said first medium;

whereby the transmission of said flux 1' is indirectly controlled by said second flux, which directly controls the transmission of said first flux, which said first flux in turn directly controls the transmission of said flux, 1'.

4. The apparatus of claim 1 in which said medium is incorporated into a planar configuration of one or more thin film waveguides and a substrate material stacked in the vertical dimension, said medium comprising one of the thin film waveguides, or the substrate material, and means in communication with said planar configuration for introducing said first flux of photons into one of the thin film waveguides along one side of the planar configuration and propagating parallel to the adjoining side;

and means in communication with said planar configuration for introducing said second flux of photons into one of the thin film waveguides, said second flux introduced along an adjoining side of said planar configuration such that the paths of said fluxes are perpendicular to one another and either cross one another directly if said fluxes are propagating in the same thin film, or pass one another on perpendicular paths if said fluxes are propagating in separate films;

and furthermore, means for introducing $n_1$ fluxes of photons with photon energy equivalent to that of photons of said first flux along one side of a given thin film waveguide of said planar configuration, said $n_1$ fluxes propagating on separate but parallel paths; and means for introducing $n_2$ fluxes of photons with photon energy equivalent to that of photons of said second flux along an adjoining side of said planar configuration, said $n_2$ fluxes introduced into the same thin film waveguide as the $n_1$ fluxes, or a separate thin film waveguide, and said $n_2$ fluxes introduced on separate but parallel paths, where $n_1$ and $n_2$ may range from 1 to any number compatible with the dimensions of said planar configuration;

such that, the transmission of $n_1$ fluxes of said first flux are controlled by $n_2$ fluxes of the type of said second flux and, the control of the transmission of the $n_1$ fluxes of the type of said first flux is more efficient than if the return of excited states from level 3 to level 2 did not occur in said medium;

and furthermore, the introduction of a total of $n_1$ photons from $n_2$ fluxes of the type of said second flux, causes a change in the transmission of $n_2$ photons of a given flux of the type of said first flux, wherein $n_2$ is greater than $n_1$, when $\tau_p^{-1} >> \tau_2^{-1}$, $k' \geq 0.90$, $\tau_{31}^{-1}/\tau_3^{-1} \geq 0.80$, and $\tau_2^{-1}/(\gamma\sigma_{23}S_f) \leq 0.01$, and when $\tau_p^{-1} << \tau_2^{-1}$, $k' \geq 0.90$, $\tau_{31}^{-1}/\tau_3^{-1} \geq 0.80$, and $\tau_p^{-1}/\gamma\sigma_{23}S_f) \leq 0.01$, where k' is the fraction of the total flux introduced by all $n_2$ fluxes of the type of said second flux that is absorbed in a volume of said medium, via direct interaction or evanescent fields, which volume is the volume traversed by said given flux of the type of said first flux or the evanescent field thereof, and $S_f$ is the final number of photons per square centimeter per second in said given flux after traversing the planar configuration.

5. The apparatus according to claim 1 including means for introducing a third flux of photons, or the evanescent field thereof, into the second medium, said introduction related in time to the removal of said transmitted first flux, or the evanescent field thereof, from said second medium, said third flux of photons reducing the population of level 2' of said second medium, such that the transmission of said flux, 1', is restored to the original level of transmission, prior to the introduction of said transmitted first flux or the evanescent field thereof, on a time scale that is shorter than, and independent of the lifetime of level 2', and that is controlled by the timing of the introduction of said third flux of photons with respect to the removal of said transmitted first flux, or their respective evanescent fields.

6. The apparatus of claim 1 in which said light transmissive material contains one or more rare-earth elements.

7. The apparatus of claim 6 in which said rare-earth element or elements occurs in said medium as a divalent dopant.

8. The apparatus of claim 6 wherein the rare-earth dopant is selected from the group consisting of $Dy^{2+}$, $Tm^{2+}$, $Er^{2+}$ and $Ho^{2+}$.

9. The apparatus of claim 1 in which said light transmissive medium is a section of optical fiber core.

10. The apparatus of claim 1 in which said light transmissive medium is a section of optical fiber cladding.

11. The apparatus of claim 1 in which said light transmissive medium is a liquid or gas in a capillary tube.

12. The apparatus of claim 1 in which said light transmissive medium is a thin film waveguide.

13. The apparatus of claim 1 in which said light transmissive medium is the substrate on which a thin film waveguide is deposited.

14. The apparatus of claim 1 in which said first flux, or the evanescent field thereof, and said second flux, or the evanescent field thereof, are introduced into said medium via propagation of said fluxes along an optical fiber.

15. The apparatus of claim 1 in which said first flux, or the evanescent field thereof, and said second flux, or the evanescent field thereof, are introduced into said medium via propagation of said fluxes along two different optical fibers.

16. The apparatus of claim 1 in which said second flux is introduced into said medium via an incoherent light source located in the annular space between an optical fiber and a coaxial light reflector.

17. The apparatus of claim 1 in which said first flux, and said second flux, or the evanescent fields thereof are introduced into said medium via propagation in the same thin film waveguide.

18. The apparatus of claim 1 in which said first and said second fluxes, or the evanescent fields of one or both of said fluxes, are introduced into said medium via propagation in different thin film waveguides.

19. The apparatus of claim 1, in which said light transmissive medium is a thin film waveguide, and means for introducing said first flux or said second flux, or the evanescent field thereof, incorporates edge coupling.

20. The apparatus of claim 1 in which said light transmissive medium is a thin film waveguide, and means for introducing said first flux or said second flux, or the evanescent field thereof, incorporates prism coupling.

21. The apparatus of claim 3, in which the energy gap between said energy levels 2' and 3' of said second medium matches the energy of the photons in said second flux of photons, and, consequently, in which the wavelength of said flux 1', whose energy E' is specified to match the energy gap between levels 2' and 3', corresponds to the wavelength of said second flux, wherefore, the overall transmitted output of said two media used in conjunction as specified in claim 6, i.e., the transmitted portion of flux 1', occurs at the same wavelength as the initial controlling input of said two media used in conjunction.

22. The apparatus of claim 3 in which said two media are adjacent sections of an optical fiber core.

23. The apparatus of claim 3 in which said two media are adjacent sections of optical fiber cladding.

24. The apparatus of claim 3 in which said two media are incorporated into adjacent sections of an optical fiber, one medium incorporated into a section of fiber core, and one medium incorporated into a section of fiber cladding.

25. The apparatus of claim 3 in which said two media comprise two thin films lying one on top of the other, such that said first and second fluxes propagate in one film, and said flux 1' propagates in the other film, the transmission of said flux 1' controlled by the evanescent field of said first flux.

26. The apparatus of claim 4 in which means for introducing 1 or more said fluxes incorporates edge coupling.

27. The apparatus of claim 4 in which means for introducing 1 or more said fluxes incorporates pism coupling.

28. The apparatus of claim 4 in which said medium comprises the substrate on which the thin film waveguide is deposited in which said fluxes propagate and interact with said medium via their evanescent fields.

29. The apparatus of claim 4 in which said medium comprises the thin film waveguide in which said fluxes propagate.

30. The apparatus of claim 4 in which said medium comprises the thin film waveguide in which one of said type of fluxes propagates, the other of which said type of fluxes interacts via its evanescent field while propagating in an adjacent thin film waveguide.

31. The apparatus of claim 4 in which said medium comprises a thin film waveguide sandwiched between two other thin film waveguides, in one of which one of said type of fluxes propagates, and in the other of which thin film waveguide, the other of said type of fluxes propagates, all fluxes interacting with said medium via their evanescent fields.

32. Method for controlling the transmission of radiant energy through a light transmissive medium comprising the steps of:

introducing a first flux of photons, or the evanescent field thereof, into said medium, said photons having energy E, and said medium having energy level characteristics such that the energy, E, of said first flux of photons matches an energy gap between an energy level designated as energy level 2, and another energy level designated as energy level 3 of said medium, and said first flux is substantially unattenuated as said first flux of photons, or the evanescent field thereof, passes through said medium; and selectively introducing a second flux of photons, or the evanescent field thereof, into said medium to attenuate said first flux of photons, said second flux of photons causing the population of energy level two of said medium, wherein a portion of said first flux is absorbed, inducing a population in level 3, a portion of which population in level 3 returns to level 2 and is available for further attenuation of said first flux, whereby the control of the transmission of said first flux of photons by said second flux of photons is more efficient than if the return of excited states from level 3 to level 2 did not occur wherein the introduction of $n_1$ photons of said second flux, or the evanescent field thereof, causes the absorption of $n_2$ photons of said first flux, wherein $n_2$ is greater than $n_1$, when $\tau_p^{-1} >> \tau_2^{-1}$, $k \geq 0.90$, $\tau_{31}^{-1}/\tau_3^{-1} \geq 0.80$, and $\tau_2^{-1}/(\gamma\sigma_{23}S_f) \leq 0.01$, where $\tau_p^{-1}$ is the pulse rate of said second flux, $\sigma_2^{-1}$ is the spontaneous decay rate from level 2, k is the fraction of said second flux which is absorbed in populating level two of said medium, $\tau_{31}^{-1}$ is the decay rate for direct transitions from level 3 to level 1, $\tau_2^{-1}$ is the overall spontaneous decay rate from level 3, $\tau = 1$ is the effective cross section for absorption of said first flux in inducing transitions from level 2 to level 3, where $\gamma = 1$ if said first flux is introduced directly into said medium, $\gamma < 1$ if the evanescent field of said first flux is introduced into said medium, and $S_f$ is the final number of photons per square centimeter per second in said first flux after said first flux, or the evanescent field thereof, has passed through said medium;

and wherein the introduction of said second flux, or the evanescent field thereof, causes the absorption of $n_2$ photons of said first flux, wherein $n_2$ is greater than $n_1$, when $\tau_p^{-1} << \tau_2^{-1}$, $k \geq 0.90$, $\tau_{31}^{-1}/\tau_{31}^{-1} \geq 0.80$, and $\tau_p^{-1}/(\gamma\sigma_{23}S_f) \geq 0.01$.

33. The method of claim 32, in addition to which, a third flux of photons, or the evanescent field thereof, is selectively introduced into said medium to reduce the attenuation of said first flux of photons, said third flux of photons reducing the population of level 2, thereby interrupting the efficient transfer of excited states between levels 2 and 3 which causes the attenuation of said first flux of photons, whereby the reduction of attenuation of said first flux of photons by said third flux of photons is more efficient than if the return of excited states from level 2 to level 3 did not occur;

and furthermore, the introduction of $n_3$ photons of said third flux or the evanescent field thereof causes a change in the transmission of $n_4$ photons of said first flux, wherein $n_4$ is greater than $n_3$ when, $\tau_p^{-1} >> \tau_2^{-1}$, $k \geq 0.90$, $\tau_{31}^{-1}/\tau_3^{-1} \geq 0.80$, and $\tau_2^{-1}/\gamma(\gamma\sigma_{23}S_f) \leq 0.01$, and when $\tau_p^{-1} << \tau_2^{-1}$, $k \geq 0.90$, $\tau_{31}^{-1}/\tau_3^{-1} \geq 0.80$, and $\tau_p^{-1}/(\gamma\sigma_{23}S_f) \leq 0.01$.

34. The method of claim 33, wherein said third flux of photons or the evanescent field thereof is selectively introduced into said medium related in time to the removal of said second flux of photons, or the evanescent field thereof, such that the transmission of said first flux of photons is restored to the original level of transmission, prior to the introduction of said second flux of photons, or the evanescent field thereof, on a time scale that is shorter than, and independent of the lifetime of level two, and that is controlled by the timing of the introduction of said third flux of photons with respect to the removal of said second flux of photons, or their respective evanescent fields.

35. The method of claim 32, wherein a second light transmissive medium is operatively associated with said first medium, said second medium having an energy level structure such that there exists an energy gap between levels designated as 1' and 2' which equals the energy gap between levels 2 and 3 of said first medium, which is matched to the energy, E, of said first flux of photons, and, a flux of photons, designated as flux 1', or the evanescent field thereof, is selectively introduced into said second medium, said flux of photons, 1', having energy, E', which is matched to the energy gap between levels designated as levels 2' and 3' of said second medium, such that said flux of photons 1' is substantially unattenuated as said flux 1', or the evanescent field thereof passes through said second medium;

and the transmitted output of said first flux, or the evanescent field thereof, is selectively introduced into said second medium, said first flux, or the evanescent field thereof, having passed through said first medium, said first flux subsequently causing the attenuation of said flux 1' by inducing a population in energy level 2' of said second medium, wherein a portion of said flux 1', is absorbed, inducing a population in level 3', a portion of which population in level 3' returns to level 2', and is available for further attenuation of said flux, 1', whereby the transmission of said flux of photons, 1', is controlled by the transmitted output of said first flux of photons in the manner detailed in claim 1 for said first medium and said first and second fluxes;

and wherein said transmitted first flux of photons, which controls the transmission of said flux 1', as said flux 1', or the evanescent field thereof, passes through said second medium, is in turn controlled by the introduction of said second flux of photons, or the evanescent field thereof, into said first medium;

whereby the transmission of said flux 1' is indirectly controlled by said second flux, which directly controls the transmission of said first flux, which said first flux in turn directly controls the transmission of said flux, 1'.

36. The method of claim 32, wherein said medium is incorporated into a planar configuration of one or more thin film waveguides and a substrate material stacked in the vertical dimension, said medium comprising one of the thin film waveguides, or the substrate material, and into one of which thin film waveguides said first flux of photons is selectively introduced along one side of the planar configuration and propagates parallel to the adjoining sides, and into one of which thin film waveguides said second flux of photons is introduced along an adjoining side of the planar configuration such that the paths of said fluxes are perpendicular to one another and either cross one another directly if said fluxes are propagating in the same thin film, or pass one another or perpendicular paths of said fluxes are propagating in separate films;

and wherein, $\eta_1$ fluxes of photons with photon energy equivalent to that of photons of said first flux are introduced along one side of a given thin film waveguide of said planar configuration, said $\eta_1$ fluxes propagating on separate but parallel paths, and $\eta_2$ fluxes of photons with photon energy equivalent to that of photons of said second flux are introduced along an adjoining side of said planar configuration, said $\eta_2$ fluxes introduced into the same thin film waveguide as the $\eta_1$ fluxes, or a separate thin film waveguide, and said $\eta_2$ fluxes introduced on separate but parallel paths, where $\eta_1$ and $\eta_2$ may range from 1 to any number compatible with the dimensions of said planar configuration;

such that, the transmission of $\eta_1$ fluxes of the type of said first flux are controlled by $\eta_2$ fluxes of the type of said second flux and, the control of the transmission of the $\eta_1$ fluxes of the type of said first flux is more efficient than if the return of excited states from level 3 to level 2 did not occur in said medium;

and wherein the introduction of a total of n1 photons from $\eta_2$ fluxes of the type of said second flux, causes a change in the transmission of $n_2$ photons of a given flux of the type of said first flux, wherein $n_2$ is greater than $n_1$, when $\tau_p^{-1} >> \tau_2^{-1}$, $k' \geq 0.90$, $\tau_{31}^{-1}/\tau_3^{-1} \geq 0.80$, and $\tau_2^{-1}/(\gamma\sigma_{23}S_f) \leq 0.01$, and when $\tau_p^{-1} << \tau_2^{-1}$, $k' \geq 0.90$, $\tau_{31}^{-1}/\tau_3^{-1} \geq 0.80$, and $\tau_p^{-1}/(\gamma\sigma_{23}S_f) \leq 0.01$, where $k'$ is the fraction of the total flux introduced by all $\eta_2$ fluxes of the type of said second flux that is absorbed in a volume of said medium, via direct interaction or evanescent fields, which volume is the volume traversed by said given flux of the type of said first flux or the evanescent field thereof, and $S_f$ is the final number of photons per square centimeter per second in said given flux after traversing the planar configuration.

37. The method of claim 36, including an additional flux of photons designated as a third flux type is selectively introduced in connection with each of the $\eta_2$ fluxes of the type of said second flux of photons, said additional flux propagating on a coincident path with the path traversed by the corresponding flux of the type of said second flux, if said fluxes propagate in the same thin film waveguide, and said addition flux propagating on a colinear but separate path if said fluxes propagate in separate thin film waveguides, wherefore, $\eta_2$ fluxes of said third type are introduced in connection with $\eta_2$ fluxes of the type of said second flux, said fluxes of the third type reducing the attenuation of said fluxes of the type of said first flux by reducing the population of level 2 of said first flux by reducing the population of level 2 of said medium, thereby interrupting the efficient transfer of excited states between levels 2 and 3 of said medium which causes the attenuation of fluxes of the type of said first flux, whereby the reduction of attenuation of fluxes of the type of said first flux by fluxes of said third type is more efficient than if the return of excited states from level 2 to level 3 of said medium did not occur;

and wherein, the introduction of a total of n3 photons from $\eta_2$ fluxes of said third type, causes a change in transmission of $n_4$ photons of a given flux of the type of said first flux, wherein $n_4$ is greater than $n_3$ when, $\tau_p^{-1} >> \tau_2^{-1}$, $k' \geq 0.90$, $\tau_{31}^{-1}/\tau_3^{-1} \geq 0.80$, and $\tau_2^{-1}/(\gamma\sigma_{23}S_f) \leq 0.01$, and when $\tau_p^{-1} << \tau_2^{-1}$, $k \geq 0.90$, $\tau_{31}^{-1}/\tau_3^{-1} \geq 0.80$, and $\tau_p^{-1}/(\gamma\sigma_{23}S_f) \leq 0.01$, where $k'$ is the fraction of the total flux introduced by all $n_2$ fluxes of the type of said second flux that is absorbed in a volume of said medium, via direct interaction or evanescent fields, which volume is the volume traversed by said given flux of the type of said first flux or the evanescent field thereof, and $S_f$ is the final number of photons per square centimeter per second in said given flux after traversing the planar configuration.

38. The method of claim 35, including a third flux of photons, or the evanescent field thereof, selectively introduced into said first medium, to reduce the attenuation of said first flux of photons, said third flux of photons reducing the population of level 2, thereby interrupting the efficient transfer of excited states between levels 2 and 3;

Wherefore, the attenuation of said first flux is reduced and a larger portion of said first flux, or the evanescent field thereof is introduced into said second medium, whereby the population of said level 2' of said second medium is increased and consequently the attenuation of said flux 1' is increased, and wherein the reduction of attenuation of said first flux of photons by said third flux of photons is more efficient than if the return of excited states from level 2 to level 3 of said first medium did not occur, and the increase of attenuation of said flux 1' is more efficient than if the return of excited states from level 3' to level 2' of said second medium did not occur;

and wherein, the introduction of n3 photons of said third flux or the evanescent field thereof into said first medium, causes a change in the transmission of $n_4$ photons of said flux 1', wherein $n_4$ is greater than $n_3$ when $\tau_p^{-1} >> \tau_2^{-1}$, $k \geq 0.90$, $\tau_{31}^{-1}/\tau_3^{-1} \geq 0.80$, and $\tau_2^{-1}/(\gamma\sigma_{23}S_f) \leq 0.01$, and when $\tau_p^{-1} << \tau_2^{-1}$, $k \geq 0.90$, $\tau_{31}^{-1}/\tau_3^{-1} \geq 0.80$, and $\tau_p^{-1}/(\gamma\sigma_{23}S_f) \leq 0.01$, as applied to both said first and said second media.

39. The method of claim 35, wherein a third flux of photons, or the evanescent field thereof, is selectively introduced into said second medium, related in time to the removal of said transmitted first flux, or the evanescent field thereof, from said second medium, said third flux of photons reducing the population of level 2' of said second medium, such that the transmission of said flux, 1', is restored to the original level of transmission, prior to the introduction of said transmitted first flux or the evanescent field thereof, on a time scale that is shorter than, and independent of the lifetime of level 2', and that is controlled by the timing of the introduction of said third flux of photons with respect to the removal of said transmitted first flux, or their respective evanescent fields.

40. The method of claim 32 in which said second flux of photons populates level 2 by direct excitation from an original level to level 2.

41. The method of claim 32 in which said second flux of photons populates level 2 by first inducing the population of an energy level higher than level 2, a portion of which population subsequently decays to level 2.

42. The method of claim 32 in which said second flux populates level 2 by energy transfer from a dopant, said dopant being distinct from the entity characterized by the energy level structure which contains said levels 2 and 3.

43. The method of claim 35, wherein said second light transmissive medium is also characterized by an energy gap between said levels 2' and 3' which corresponds to the energy of the photons in said second flux;

and since the energy gap between levels 2' and 3' also corresponds to the energy, E', of said flux 1', said second flux and said flux 1' have the same wavelength;

wherefore, the overall transmitted output of said two media operatively associated with each other, occurs at the same wavelength as the initial controlling input of said two media used in conjunction, said second flux.

44. The method of claim 33 in which said third flux of photons depopulates level 2 by inducing transitions to a higher energy level.

45. The method of claim 33 in which said third flux of photons depopulates level 2 by inducing transistions to a lower energy level.

* * * * *